US 10,538,248 B2

(12) United States Patent
Kinoshita et al.

(10) Patent No.: US 10,538,248 B2
(45) Date of Patent: Jan. 21, 2020

(54) CONTROL APPARATUS FOR VEHICLE

(71) Applicant: SUBARU CORPORATION, Tokyo (JP)

(72) Inventors: Takahiro Kinoshita, Tokyo (JP); Hirofumi Shimizu, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/948,841

(22) Filed: Apr. 9, 2018

(65) Prior Publication Data
US 2018/0290658 A1 Oct. 11, 2018

(30) Foreign Application Priority Data

Apr. 10, 2017 (JP) ................. 2017-077680

(51) Int. Cl.
B60W 10/02 (2006.01)
B60W 10/06 (2006.01)
(Continued)

(52) U.S. Cl.
CPC .... B60W 30/18181 (2013.01); B60W 10/026 (2013.01); B60W 10/06 (2013.01);
(Continued)

(58) Field of Classification Search
CPC .... B60W 10/026; B60W 10/06; B60W 10/08; B60W 30/18127; B60W 2520/125; B60W 2710/024; B60W 2710/0605
See application file for complete search history.

(56) References Cited

U.S. PATENT DOCUMENTS

2003/0186778 A1* 10/2003 Yamamoto ............. B60K 6/485
477/5
2004/0149502 A1* 8/2004 Itoh .......................... B60K 6/48
180/65.25
(Continued)

FOREIGN PATENT DOCUMENTS

JP 2003-065124 A 3/2003
JP 2005-313831 A 11/2005
(Continued)

OTHER PUBLICATIONS

Japanese Office Action, dated Mar. 5, 2019, in Japanese Application No. 2017-077680 and Machine English Translation thereof.

Primary Examiner — Edwin A Young
(74) Attorney, Agent, or Firm — McGinn IP Law Group, PLLC

(57) ABSTRACT

A control apparatus for a vehicle that includes an engine includes an electric generator, a lock up clutch, a throttle valve, an electric generator control unit, a clutch control unit, and a throttle control unit. The clutch control unit is configured to control the lock up clutch to an engaged state on the condition that the electric generator performs the regenerative power-generation. The throttle control unit is configured to control the throttle valve openwise on the condition that the electric generator performs the regenerative power-generation. The throttle control unit is configured to control the throttle valve from openwise to closewise on the condition that the lock up clutch is controlled from the engaged state to a disengaged state, with the throttle valve having been controlled openwise in accompaniment with the regenerative power-generation of the electric generator.

18 Claims, 11 Drawing Sheets

(51) Int. Cl.
  *B60W 10/08* (2006.01)
  *B60W 30/18* (2012.01)
(52) U.S. Cl.
  CPC .. *B60W 30/1819* (2013.01); *B60W 30/18127* (2013.01); *B60W 2510/0233* (2013.01); *B60W 2510/0604* (2013.01); *B60W 2510/0638* (2013.01); *B60W 2710/024* (2013.01); *B60W 2710/0605* (2013.01); *B60W 2710/0627* (2013.01)

(56) References Cited

U.S. PATENT DOCUMENTS

| | | | | |
|---|---|---|---|---|
| 2006/0142115 A1* | 6/2006 | Senda | ............... | B60W 10/02 477/6 |
| 2014/0296027 A1 | 10/2014 | Takahashi | | |
| 2015/0149009 A1* | 5/2015 | Michikoshi | ............ | B60K 6/48 701/22 |

FOREIGN PATENT DOCUMENTS

| | | | |
|---|---|---|---|
| JP | 2013-217271 A | 10/2013 | |
| JP | 2014-201095 A | 10/2014 | |

\* cited by examiner

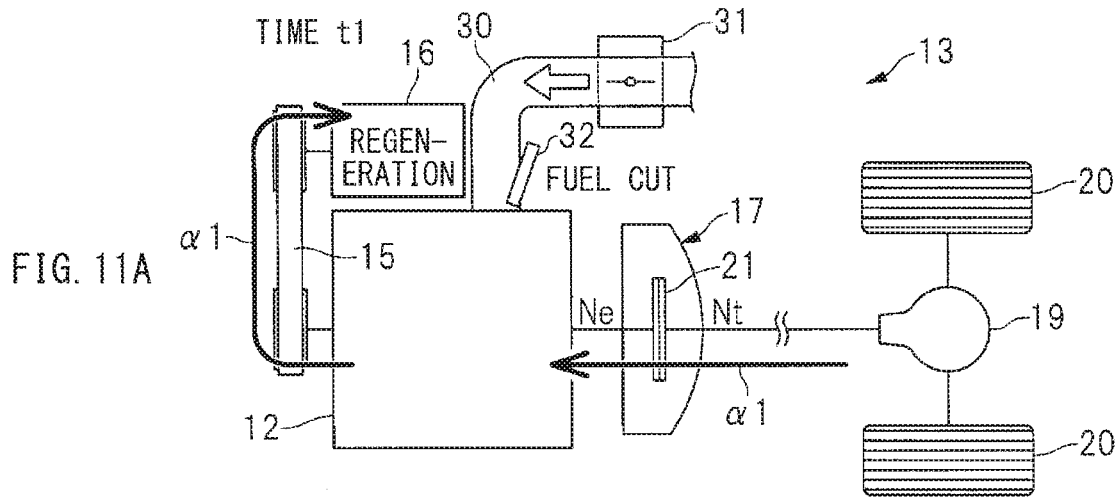
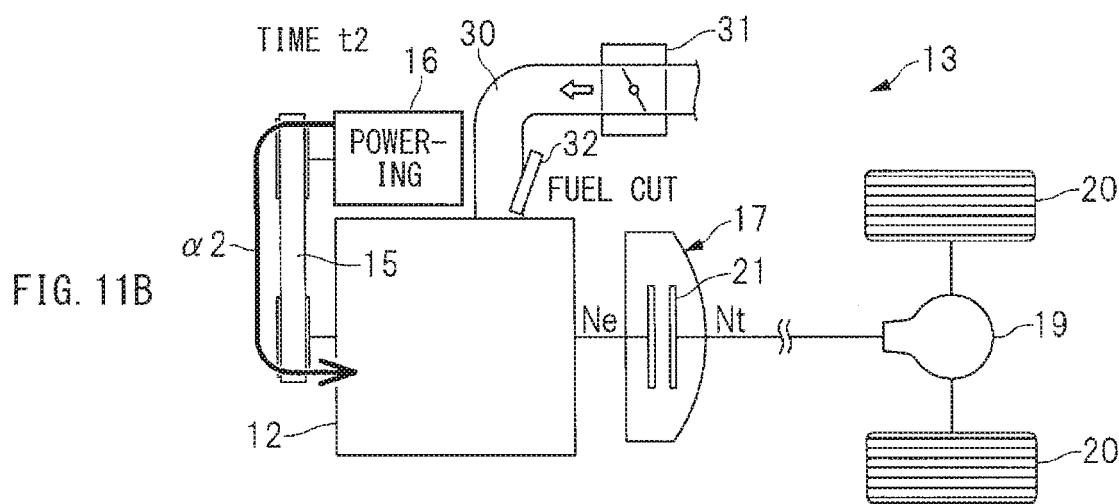
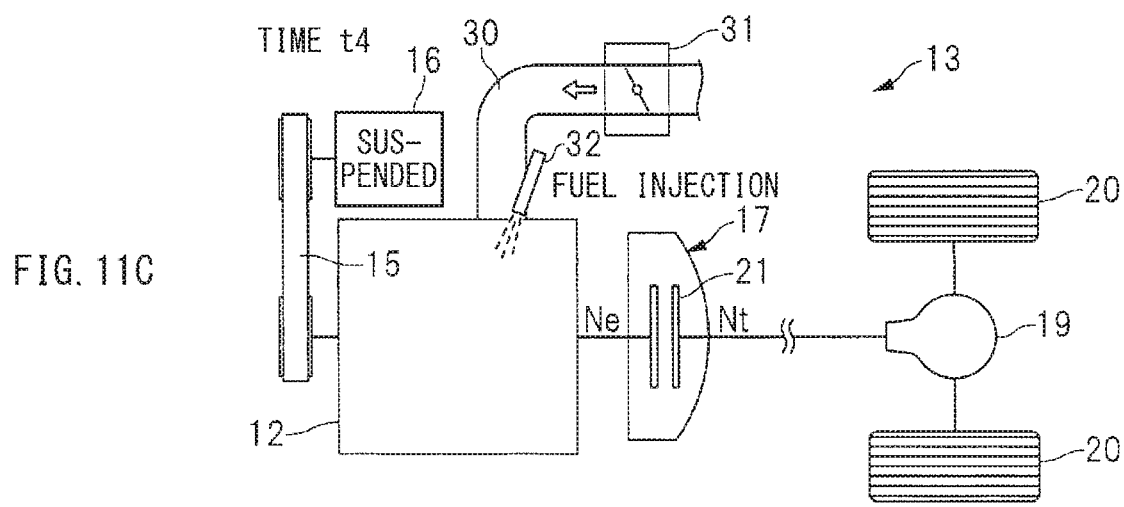

CONTROL APPARATUS FOR VEHICLE

CROSS-REFERENCE TO RELATED APPLICATIONS

The present application claims priority from Japanese Patent Application No. 2017-077680 filed on Apr. 10, 2017, the entire contents of which are hereby incorporated by reference.

BACKGROUND

The technology relates to a control apparatus for a vehicle that includes an engine.

A vehicle such as an automobile includes an electric generator such as a motor generator, an alternator, and an integrated starter generator (ISG). In many cases, the electric generator is controlled to a regenerative power-generation state on decelerated travel, from viewpoint of enhancement in fuel consumption performance of the vehicle, as described in Japanese Unexamined Patent Application Publication (JP-A) No. 2003-65124. Non-limiting examples of the decelerated travel may include coasting, and braking of the vehicle. Moreover, in a case of regenerative power-generation of the electric generator on the decelerated travel, a control apparatus described in JP-A No 2003-65124 opens a throttle valve, and thereby reduces a pumping loss of an engine. This makes it possible to reduce an engine load, and to increase a power-generation load, leading to an increase in power-generated electric power of the electric generator, and the enhancement in the fuel consumption performance of the vehicle.

SUMMARY

An aspect of the technology provides a control apparatus for a vehicle that includes an engine. The control apparatus includes an electric generator, a lock up clutch, a throttle valve, an electric generator, a clutch control unit, and a throttle control unit. The electric generator is configured to be coupled to the engine. The lock up clutch is configured to be coupled to the engine. The throttle valve is configured to control an amount of intake air of the engine. The electric generator control unit is configured to allow the electric generator to perform regenerative power-generation on decelerated travel of the vehicle. The clutch control unit is configured to control the lock up clutch to an engaged state on the condition that the electric generator performs the regenerative power-generation. The throttle control unit is configured to control the throttle valve openwise on the condition that the electric generator performs the regenerative power-generation. The throttle control unit is configured to control the throttle valve from openwise to closewise on the condition that the lock up clutch is controlled from the engaged state to a disengaged state, with the throttle valve having been controlled openwise in accompaniment with the regenerative power-generation of the electric generator.

An aspect of the technology provides a control apparatus for a vehicle that includes an engine. The control apparatus includes an electric generator, a lock up clutch, a throttle valve, and circuitry. The electric generator is configured to be coupled to the engine. The lock up clutch is configured to be coupled to the engine. The throttle valve is configured to control an amount of intake air of the engine. The circuitry is configured to allow the electric generator to perform regenerative power-generation on decelerated travel of the vehicle. The circuitry is configured to control the lock up clutch to an engaged state on the condition that the electric generator performs the regenerative power-generation. The circuitry is configured to control the throttle valve openwise on the condition that the electric generator performs the regenerative power-generation. The circuitry is configured to control the throttle valve from openwise to closewise on the condition that the lock up clutch is controlled from the engaged state to a disengaged state, with the throttle valve having been controlled openwise in accompaniment with the regenerative power-generation of the electric generator.

BRIEF DESCRIPTION OF THE DRAWINGS

FIG. 11A schematically illustrates another example of the operation state of the power unit in the decelerated travel control.

FIG. 11B schematically illustrates another example of the operation state of the power unit in the decelerated travel control.

FIG. 11C schematically illustrates another example of the operation state of the power unit in the decelerated travel control.

DETAILED DESCRIPTION

Figure 1:
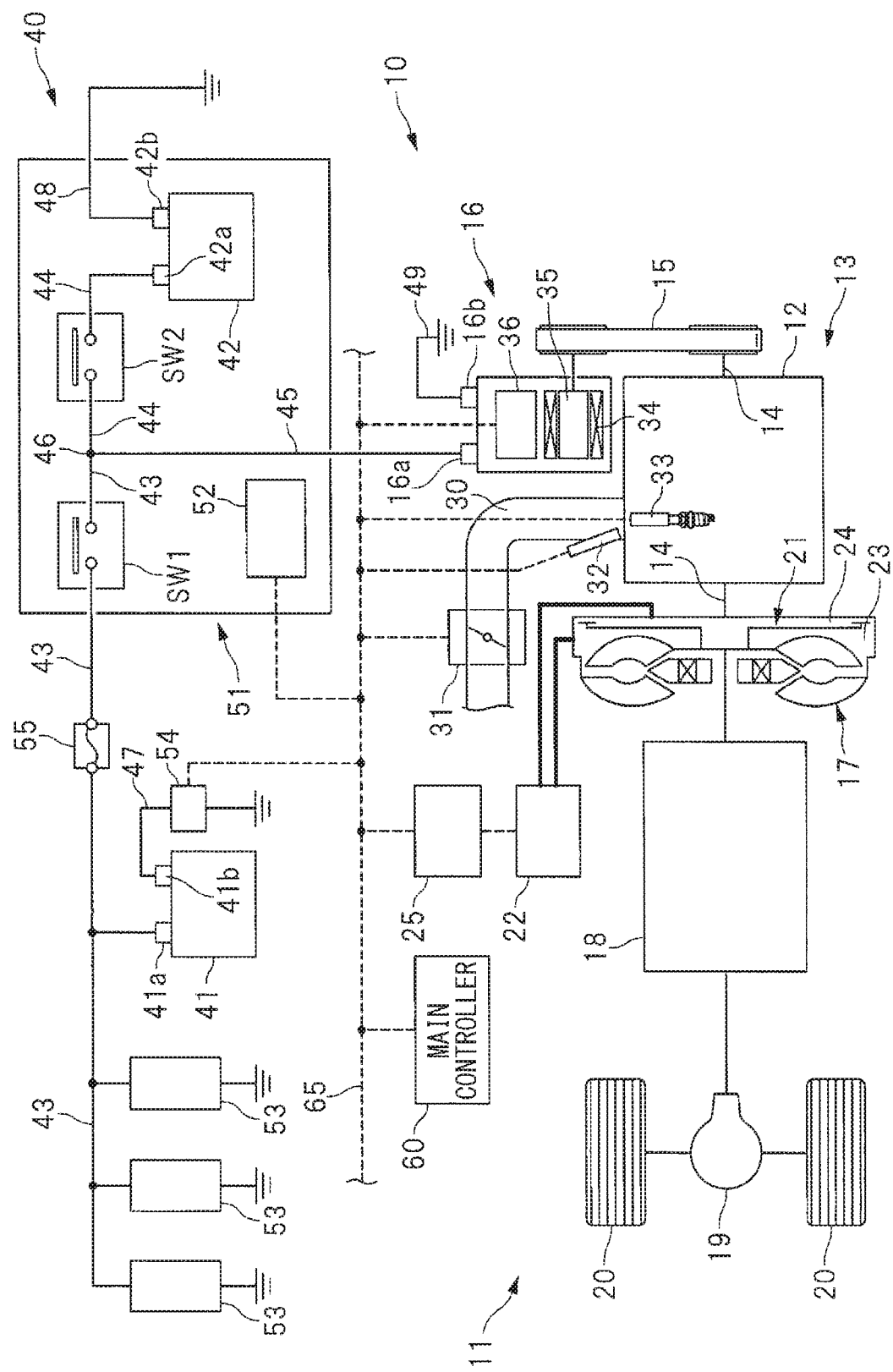
FIG. 1 schematically illustrates a vehicle provided with a control apparatus for a vehicle according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

With a throttle valve being open on decelerated travel, an amount of intake air of an engine increases. In this state, a restart of fuel injection of the engine may cause possibility of an excessive output of engine torque. Such an excessive increase in the engine torque in accompaniment with the fuel injection may constitute a possible cause of a sense of incongruity given to an occupant. However, in an attempt to suppress the excessive increase in the engine torque in accompaniment with the fuel injection, simply closing the throttle valve on the decelerated travel to decrease the amount of the intake air would cause an increase in an engine load, and a decrease in power-generated electric power on the decelerated travel. What is therefore desired is to get an adequate amount of the power-generated electric power on the decelerated travel, without giving the sense of incongruity to the occupant.

It is desirable to provide a control apparatus for a vehicle that makes it possible to get an adequate amount of power-generated electric power on decelerated travel, without giving a sense of incongruity to an occupant.

FIG. 1 is a schematic diagram illustrating a vehicle 11 provided with a control apparatus for a vehicle 10 according to an example implementation of the technology. Referring to FIG. 1, on the vehicle 11, a power unit 13 may be mounted. The power unit 13 may include an engine 12 that serves as an internal combustion engine. The engine 12 may include a crankshaft 14 to which a starter generator 16 is mechanically coupled via a belt mechanism 15. To the engine 12, a transmission mechanism 18 may also be coupled via a torque converter 17. To the transmission mechanism 18, wheels 20 may be coupled via, for example, a differential mechanism 19. In one implementation, the starter generator 16 may serve as an "electric generator" and a "generator motor".

The torque converter 17 may be coupled to the engine 12. In the torque converter 17, a lock up clutch 21 may be incorporated. In other words, to the engine 12, the lock up clutch 21 may be coupled. Controlling the lock up clutch 21 to an engaged state causes the engine 12 and the transmission mechanism 18 to be coupled via the lock up clutch 21. Controlling the lock up clutch 21 to a disengaged state causes the engine 12 and the transmission mechanism 18 to be coupled via the torque converter 17. To the torque converter 17, a valve unit 22 may be coupled. The valve unit 22 may include a plurality of solenoid valves and oil paths. Controlling oil pressures of an apply chamber 23 and a release chamber 24 with the use of the valve unit 22 causes the lock up clutch 21 to be controlled to the engaged state and to the disengaged state. Thus, the valve unit 22 may control the lock up clutch 21. The valve unit 22 may be controlled by a mission controller 25. The mission controller 25 may include, for example, a microcomputer.

The engine 12 may include an intake manifold 30. The intake manifold 30 may include a throttle valve 31 that controls an amount of intake air. Opening the throttle valve 31 makes it possible to increase the amount of the intake air of the engine 12. Closing the throttle valve 31 makes it possible to decrease the amount of the intake air of the engine 12. Moreover, the engine 12 may include an injector 32 that injects fuel into an intake port or a cylinder. Allowing the injector 32 to inject the fuel causes the engine 12 to be controlled to a fuel injection state. Stopping fuel injection from the injector 32 causes the engine 12 to be controlled to a fuel cut state. Furthermore, the engine 12 may include an ignition device 33 including an ignitor and an ignition coil. Allowing the ignition device 33 to control ignition timing makes it possible to control, for example, output torque of the engine 12 and a combustion temperature. It is to be noted that the throttle valve 31, the injector 32, and the ignition device 33 may be controlled by a main controller 60 described later.

The starter generator 16 is coupled to the engine 12. The starter generator 16 may be a so-called integrated starter generator (ISG) that serves both as an electric generator and an electric motor. The starter generator 16 may serve not only as the electric generator to be driven by the crankshaft 14 but also as the electric motor that causes rotation of the crankshaft 14. The starter generator 16 may be controlled to a powering state, for example, in restarting the engine 12 in an idling stop control, and in assisting the engine 12 in driving at the time of a start or acceleration.

The starter generator 16 may include a stator 34 having a stator coil and a rotor 35 having a field coil. The starter generator 16 may further include an ISG controller 36 in order to control an electrically conductive state of each of the stator coil and the field coil. The ISG controller 36 may include, for example, an inverter, a regulator, and a microcomputer. The ISG controller 36 may control the electrically conductive state of each of the field coil and the stator coil, thus controlling, for example, a power-generation voltage, power-generation torque, and powering torque of the starter generator 16.

[Power Supply Circuit]

Figure 2:
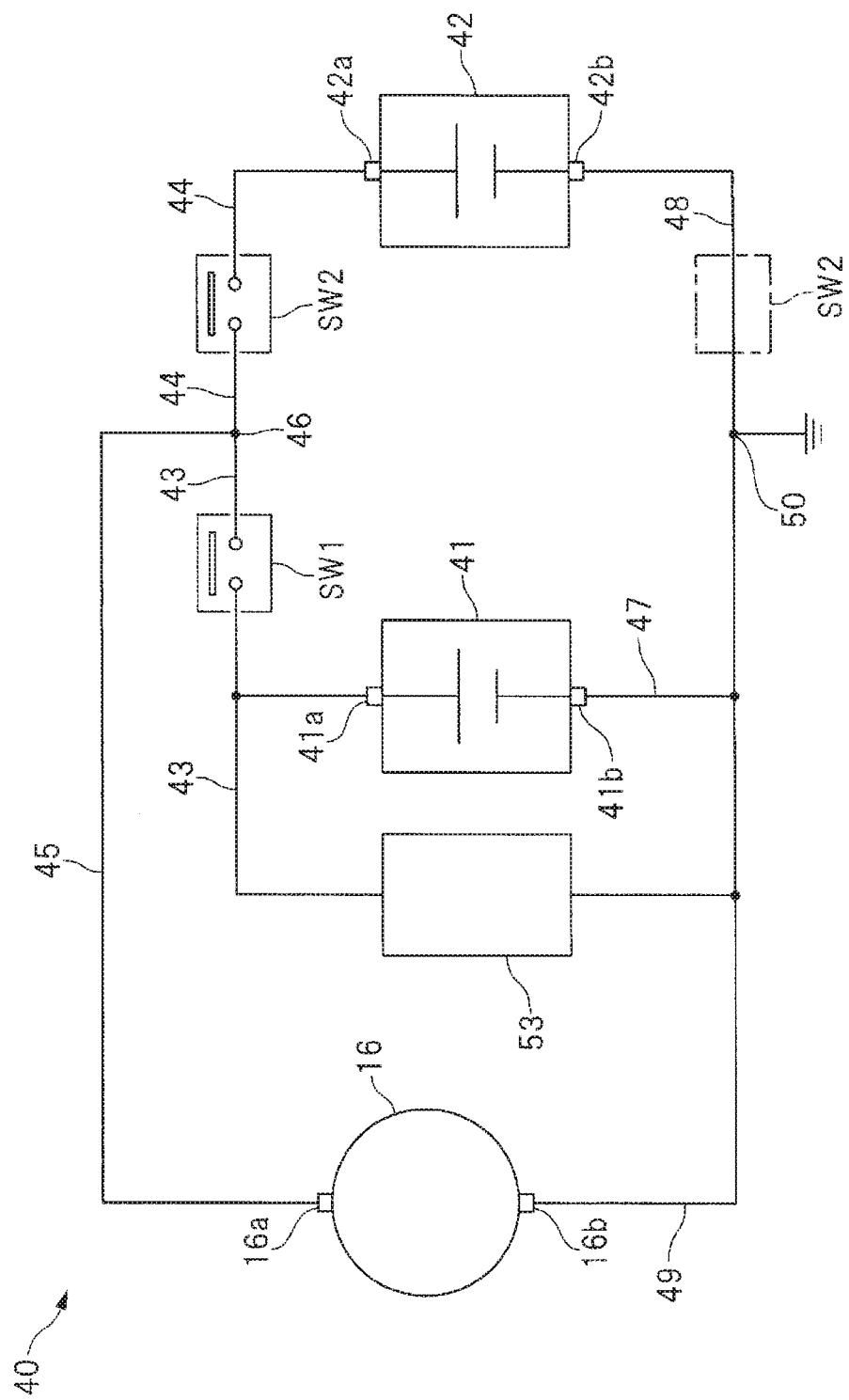
FIG. 2 is a circuit diagram illustrating an example of a power supply circuit.

A description is given of a power supply circuit 40 included in the control apparatus for the vehicle 10. FIG. 2 is a circuit diagram illustrating an example of the power supply circuit 40. Referring to FIG. 2, the power supply circuit 40 may include a lead battery 41 and a lithium-ion battery 42. The lead battery 41 may be electrically coupled to the starter generator 16. The lithium-ion battery 42 may be electrically coupled to the starter generator 16, in parallel to the lead battery 41. A terminal voltage of the lithium-ion battery 42 may be higher in design than a terminal voltage of the lead battery 41, in order to actively cause discharge of the lithium-ion battery 42. Further, internal resistance of the lithium-ion battery 42 may be smaller in design than internal resistance of the lead battery 41, in order to actively cause charge and the discharge of the lithium-ion battery 42. Thus, to the starter generator 16, coupled in parallel may be the lead battery 41 and the lithium-ion battery 42 that differ in the internal resistance from each other.

The lead battery 41 may include a positive electrode terminal 41a coupled to a positive electrode line 43. The lithium-ion battery 42 may include a positive electrode terminal 42a coupled to a positive electrode line 44. The starter generator 16 may include a positive electrode terminal 16a coupled to a positive electrode line 45. These positive electrode lines 43 to 45 may be coupled to one another via a node 46. The lead battery 41 may include a negative electrode terminal 41b coupled to a negative electrode line 47. The lithium-ion battery 42 may include a negative electrode terminal 42b coupled to a negative electrode line 48. The starter generator 16 may include a negative electrode terminal 16b coupled to a negative electrode line 49. These negative electrode lines 47 to 49 may be coupled to one another via a reference potential point 50.

On the positive electrode line 43 of the lead battery 41, a switch SW1 may be provided. The switch SW1 may be switched between an electrically conductive state and a cutoff state. Controlling the switch SW1 to the electrically conductive state causes the starter generator 16 and the lead battery 41 to be coupled to each other. Controlling the switch SW1 to the cutoff state causes the starter generator 16 and the lead battery 41 to be isolated from each other. Further, on the positive electrode line 44 of the lithium-ion battery 42, a switch SW2 may be provided. The switch SW2 may be switched between an electrically conductive state and a cutoff state. Controlling the switch SW2 to the electrically conductive state causes the starter generator 16 and the lithium-ion battery 42 to be coupled to each other. Controlling the switch SW2 to the cutoff state causes the starter generator 16 and the lithium-ion battery 42 to be isolated from each other.

The switch SW1 and the switch SW2 may each be configured by a semiconductor element such as, but not limited to, a metal-oxide-semiconductor field-effect transistor (MOSFET). In an alternative implementation, the switch SW1 and the switch SW2 may each be a switch that mechanically opens and closes a contact by means of, for example, electromagnetic force. It is to be noted that the switch SW1 and the switch SW2 are each referred to as, for example, a relay or a contactor as well.

As illustrated in FIG. 1, the power supply circuit 40 may include a battery module 51. In the battery module 51, incorporated may be the lithium-ion battery 42, and the switches SW1 and SW2. The battery module 51 may further include a battery controller 52. The battery controller 52 may include, for example, a microcomputer. The battery controller 52 may have a monitoring function and a control function. Non-limiting examples of the monitoring function may include monitoring of a state of charge SOC, charge and discharge currents, the terminal voltage, a cell temperature, and the internal resistance of the lithium-ion battery 42. Non-limiting examples of the control function may include controlling the switches SW1 and SW2. It is to be noted that the state of charge SOC refers to a ratio of an electricity storage amount of the battery to a designed capacity of the battery.

Moreover, to the positive electrode line 43 of the lead battery 41, a plurality of electric devices 53 may be coupled. On the negative electrode line 47 of the lead battery 41, a battery sensor 54 may be provided. The battery sensor 54 may have a detection function. Non-limiting examples of the detection function may include detection of a charge current, a discharge current, the terminal voltage, a state of charge SOC of the lead battery 41. It is to be noted that on the positive electrode line 43, a fuse 55 may be provided. The fuse 55 may protect, for example, the electric devices 53.

[Control System of Control Apparatus for Vehicle]

Figure 3:
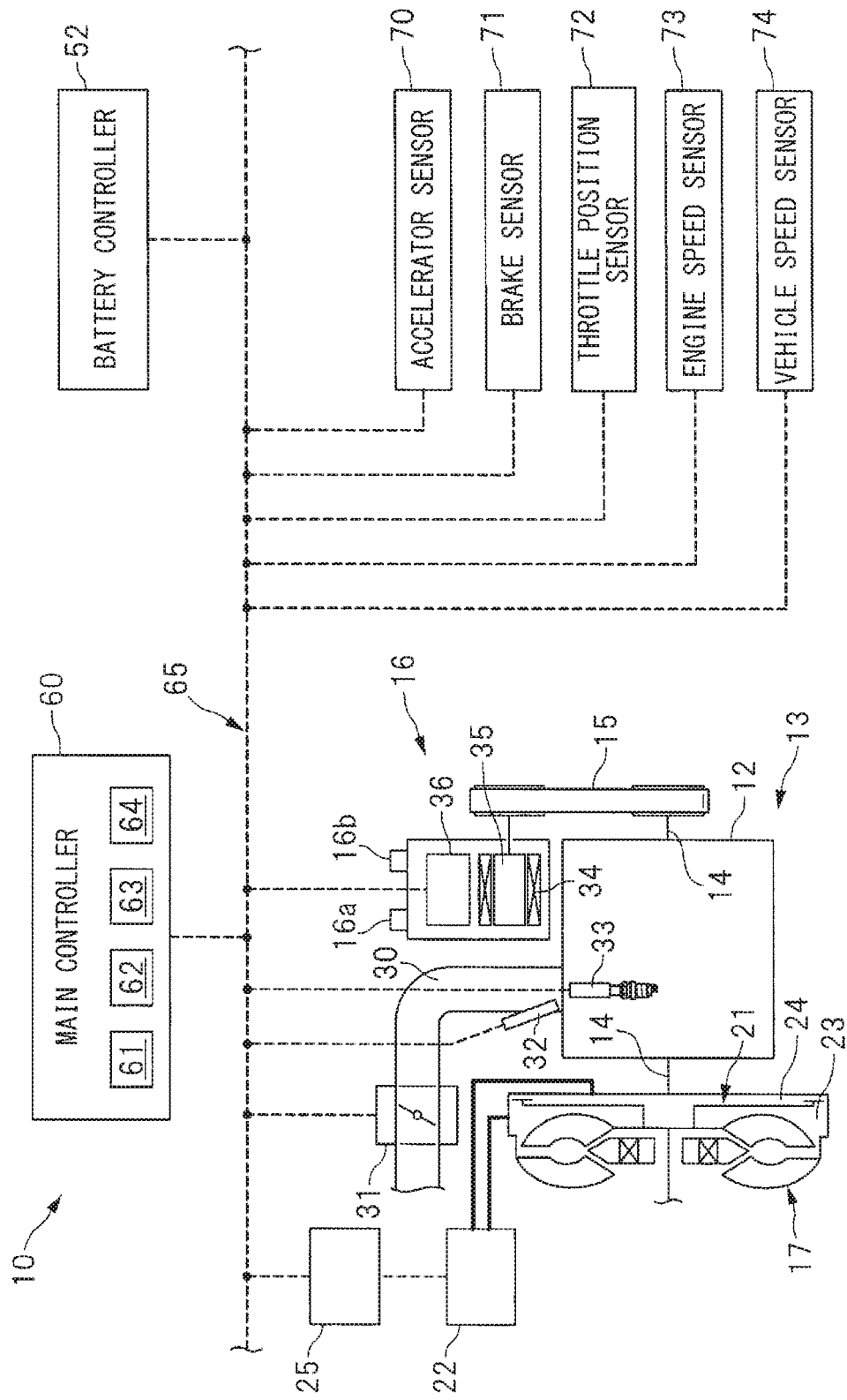
FIG. 3 schematically illustrates a control system of the control apparatus for the vehicle.

Described is a control system of the control apparatus for the vehicle 10. FIG. 3 is a schematic diagram of the control system of the control apparatus for the vehicle 10. Referring to FIGS. 1 and 3, the control apparatus for the vehicle 10 may include a main controller 60. The main controller 60 may control, for example, the starter generator 16, the throttle valve 31, the injector 32, and the ignition device 33. The main controller 60 may include, for example, a microcomputer. The main controller 60 may include functional units such as, but not limited to, an engine control unit 61, a throttle control unit 62, an electric generator control unit 63, and a clutch control unit 64. The engine control unit 61 may control, for example, the injector 32 and the ignition device 33. The throttle control unit 62 may control the throttle valve 31. The electric generator control unit 63 may control the starter generator 16. The clutch control unit 64 may control the lock up clutch 21.

The main controller 60, and the controllers 25, 36, and 52 as mentioned above may be so coupled to one another as to be able to perform a communication mutually and freely via an on-vehicle network 65. Non-limiting examples of the on-vehicle network 65 may include a controller area network (CAN) and a local interconnect network (LIN). The main controller 60 may control, for example, the starter generator 16, the throttle valve 31, the injector 32, and the ignition device 33, on the basis of information from various controllers and sensors. It is to be noted that the main controller 60 may output a control signal to the ISG controller 36, and thereby control, for example, the power-generation voltage and the power-generation torque of the starter generator 16. Moreover, the main controller 60 may output a control signal to the mission controller 25, and thereby control the lock up clutch 21 to the engaged state or the disengaged state.

As illustrated in FIG. 3, non-limiting examples of the sensors to be coupled to the main controller 60 may include an accelerator sensor 70, a brake sensor 71, a throttle position sensor 72, an engine speed sensor 73, and a vehicle speed sensor 74. The accelerator sensor 70 may detect an operation state of an accelerator pedal. The brake sensor 71 may detect an operation state of a brake pedal. The throttle position sensor 72 may detect a throttle plate position of the throttle valve 31. The engine speed sensor 73 may detect the number of rotations of the engine, i.e., a rotation speed of the engine 12. The vehicle speed sensor 74 may detect a vehicle speed, i.e., a travel speed of the vehicle 11. Moreover, the main controller 60 may be supplied, from the ISG controller 36, with information regarding, for example, the power-generation voltage and the power-generation torque of the starter generator 16. The main controller 60 may be supplied, from the mission controller 25, with information regarding, for example, an operation state of the lock up clutch 21. The main controller 60 may be supplied, from the battery controller 52, with information regarding, for example, the state of charge SOC of the lithium-ion battery 42.

[Power Supply States]

Figure 4:
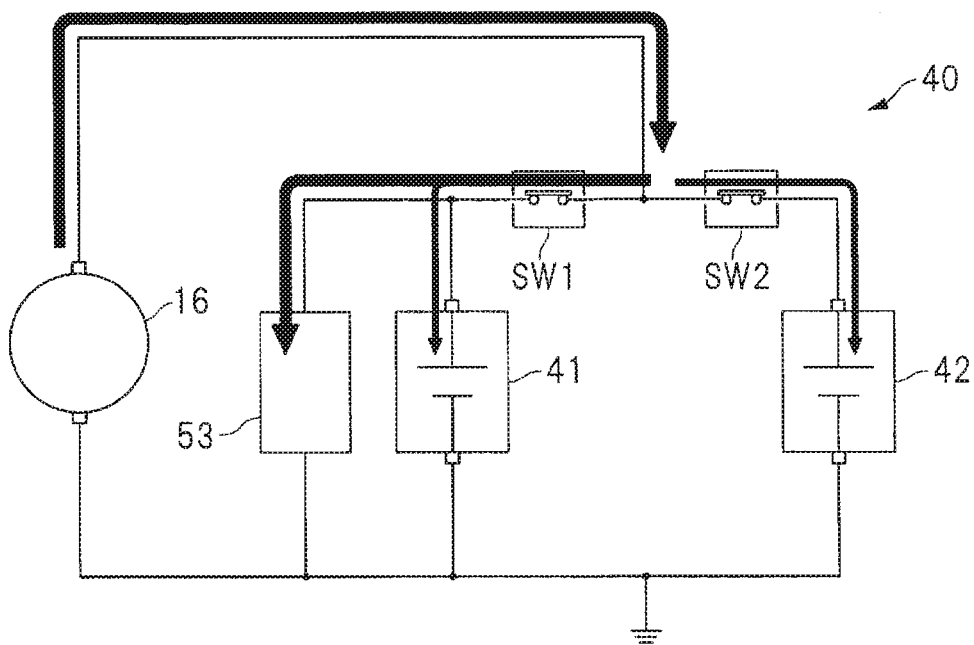
FIG. 4 describes an example of a power supply state, with a starter generator being controlled to a combustion power-generation state.
Figure 5:
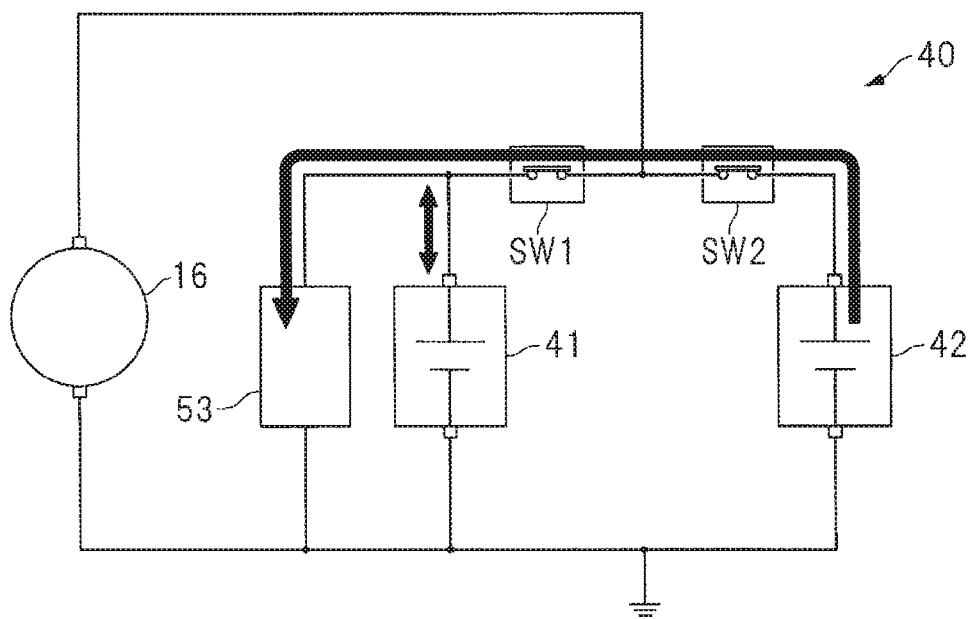
FIG. 5 describes an example of the power supply state, with the starter generator being controlled to a power-generation suspended state.
Figure 6:
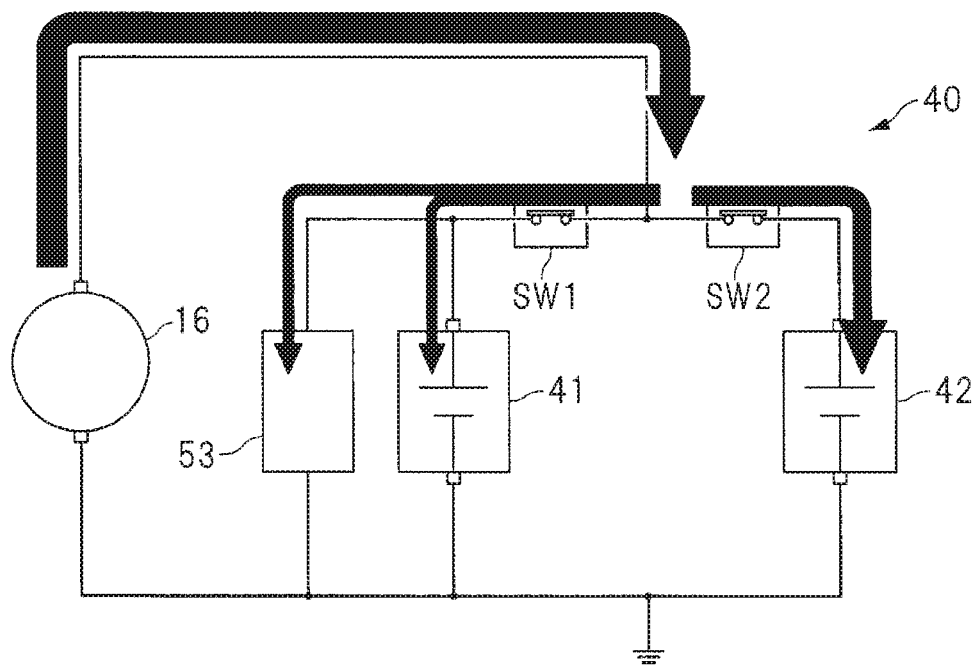
FIG. 6 describes an example of the power supply state, with the starter generator being controlled to a regenerative power-generation state.
Figure 7:
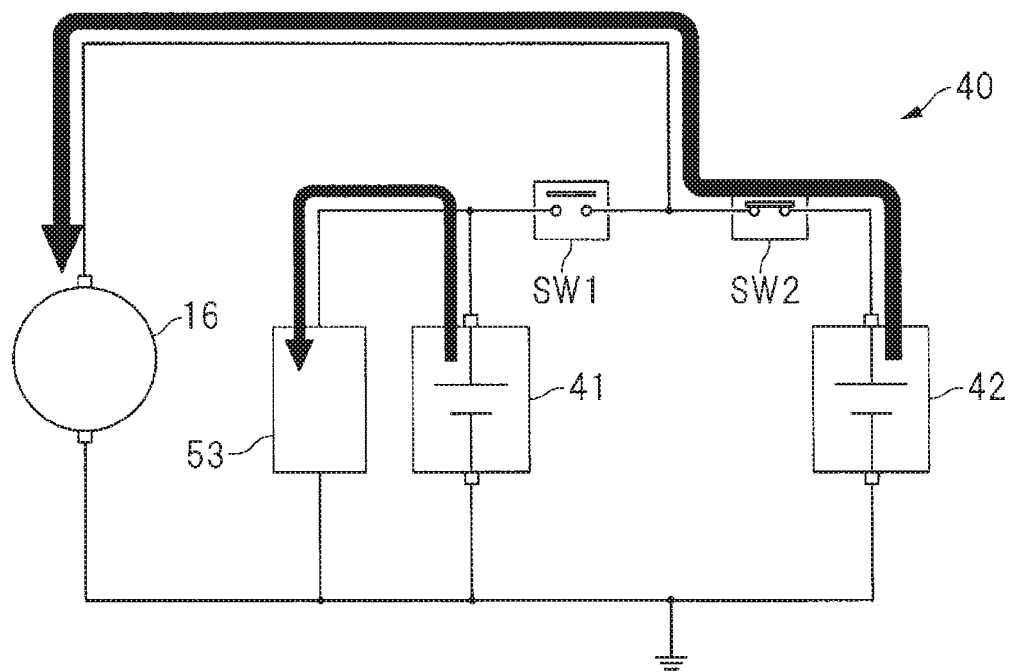
FIG. 7 describes an example of the power supply state, with the starter generator being controlled to a powering state.

A description is given of power supply states in accompaniment with a power-generation control and a powering control of the starter generator 16. FIG. 4 illustrates one example of the power supply state, with the starter generator 16 being controlled to a combustion power-generation state. FIG. 5 illustrates one example of the power supply state, with the starter generator 16 being controlled to a power-generation suspended state. FIG. 6 illustrates one example of the power supply state, with the starter generator 16 being controlled to a regenerative power-generation state. FIG. 7 illustrates one example of the power supply state, with the starter generator 16 being controlled to the powering state.

Referring to FIG. 4, in a case where the electricity storage amount of the lithium-ion battery 42 has lowered, the starter generator 16 may be controlled to the combustion power-generation state. In other words, in a case where the state of charge SOC of the lithium-ion battery 42 is lower than a predetermined lower limit, the starter generator 16 may be controlled to the combustion power-generation state, in order to charge the lithium-ion battery 42 and to increase the state of charge SOC. In controlling the starter generator 16 to the combustion power-generation state, the power-generation voltage of the starter generator 16 may be raised to a greater value than the terminal voltage of the lithium-ion battery 42. This causes the power-generated electric power to be supplied from the starter generator 16 to, for example, the lithium-ion battery 42, the electric devices 53, and the lead battery 41, as denoted by black arrows in FIG. 4. It is to be noted that the combustion power-generation state of the starter generator 16 means a state in which the starter generator 16 is driven by the engine 12, to generate electric power.

Referring to FIG. 5, in a case where the electricity storage amount of the lithium-ion battery 42 is sufficient, the starter generator 16 may be controlled to the power-generation suspended state. In other words, in a case where the state of charge SOC of the lithium-ion battery 42 is higher than a predetermined upper limit, the starter generator 16 may be controlled to the power-generation suspended state, in order to prompt the lithium-ion battery 42 to discharge, and to reduce the engine load. In controlling the starter generator 16 to the power-generation suspended state, the power-generation voltage of the starter generator 16 may be lowered to a smaller value than the terminal voltage of the lithium-ion battery 42. This causes electric power to be supplied from the lithium-ion battery 42 to, for example, the electric devices 53, as denoted by a black arrow in FIG. 5. Hence, it is possible to suppress or stop power generation of the starter generator 16, and to reduce the engine load.

As mentioned above, the main controller 60 may control the starter generator 16 to the combustion power-generation state or the power-generation suspended state on the basis of the state of charge SOC. Meanwhile, on the decelerated travel, it is necessary to recover much kinetic energy, and to enhance fuel consumption performance. Therefore, on the decelerated travel, the starter generator 16 may be controlled to the regenerative power-generation state, and the power-generation voltage of the starter generator 16 may be raised within a range in which the power-generation voltage of the starter generator 16 is not higher than withstanding voltages of, for example, the batteries 41 and 42, and the electric devices 53. This makes it possible to increase the power-generated electric power of the starter generator 16. It is therefore possible to actively convert the kinetic energy to electric energy, and recover the electric energy, leading to enhancement in energy efficiency of the vehicle 11 and enhancement in the fuel consumption performance.

As described above, whether or not to control the starter generator 16 to the regenerative power-generation state may be determined on the basis of, for example, the operation states of the accelerator pedal and the brake pedal. Specifically, in coasting, stepping down of the accelerator pedal or the brake pedal is released. In braking of the vehicle, the brake pedal is stepped down. In these cases, a fuel cut of the engine 12 may be exerted, resulting in deceleration of the vehicle 11, i.e., discharge of much kinetic energy from the vehicle 11. Thus, the starter generator 16 may be controlled to the regenerative power-generation state. In contrast, on accelerated travel or on steady travel, the accelerator pedal is stepped down. In this case, the fuel injection of the engine 12 may be exerted. Thus, the starter generator 16 may be controlled to the combustion power-generation state or the power-generation suspended state.

In controlling the starter generator 16 to the regenerative power-generation state, the power-generation voltage of the starter generator 16 may be raised within the range in which the power-generation voltage of the starter generator 16 is not higher than the withstanding voltages of, for example, the batteries 41 and 42, and the electric devices 53. This causes a large current to be supplied from the starter generator 16 to the lithium-ion battery 42 and the lead battery 41, as denoted by black arrows in FIG. 6, making it possible to rapidly charge the lithium-ion battery 42 and the lead battery 41. It is to be noted that because the internal resistance of the lithium-ion battery 42 is smaller than the internal resistance of the lead battery 41, most of the power-generated current is supplied to the lithium-ion battery 42.

As illustrated in FIGS. 4 to 6, in controlling the starter generator 16 to the combustion power-generation state, the regenerative power-generation state, and the power-generation suspended state, the switches SW1 and SW2 may be maintained in the electrically conductive state. In other words, in the control apparatus for the vehicle 10, it is possible to control the charge and the discharge of the lithium-ion battery 42, without making a switching control of the switches SW1 and SW2, solely by controlling the power-generation voltage of the starter generator 16. It is therefore possible to easily control the charge and the discharge of the lithium-ion battery 42, and to enhance durability of the switches SW1 and SW2.

Moreover, as illustrated in FIG. 7, in controlling the starter generator 16 to the powering state, the switch SW1 may be switched from the electrically conductive state to the cutoff state. In other words, the switch SW1 may be switched from the electrically conductive state to the cutoff state, in a case where the starter generator 16 causes the engine 12 to start and rotate, and in a case where the starter generator 16 assists the engine 12 in driving. This makes it possible to prevent an instantaneous voltage drop with respect to, for example, the electric devices 53, even in a case with a supply of a large current from the lithium-ion battery 42 to the starter generator 16. It is therefore possible to allow, for example, the electric devices 53 to function normally.

[Decelerated Travel Control]

Figure 8:
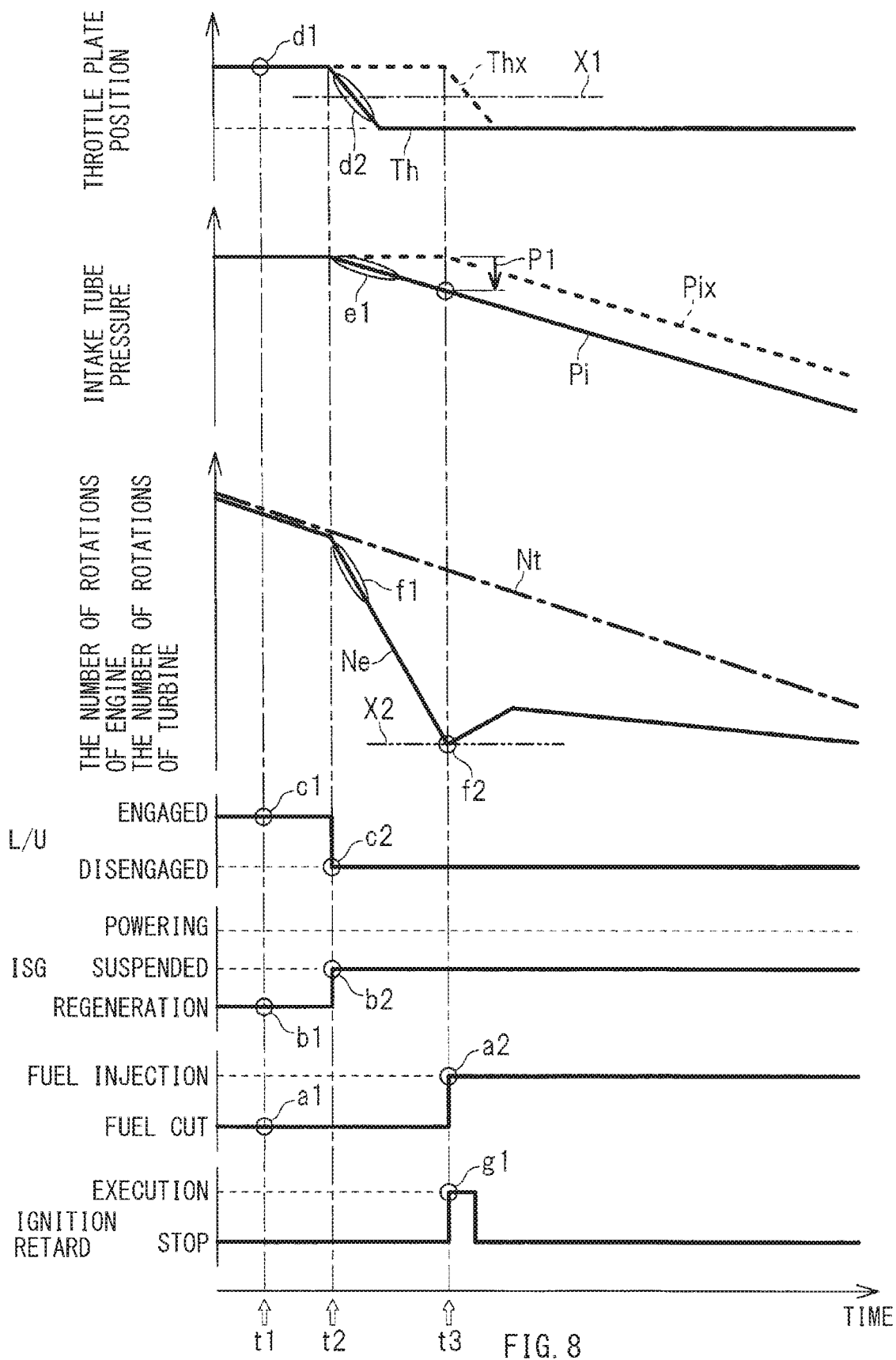
FIG. 8 is a timing chart illustrating an example of operation states of the starter generator, an injector, a throttle valve, and an ignition device in a decelerated travel control.
Figure 9A:
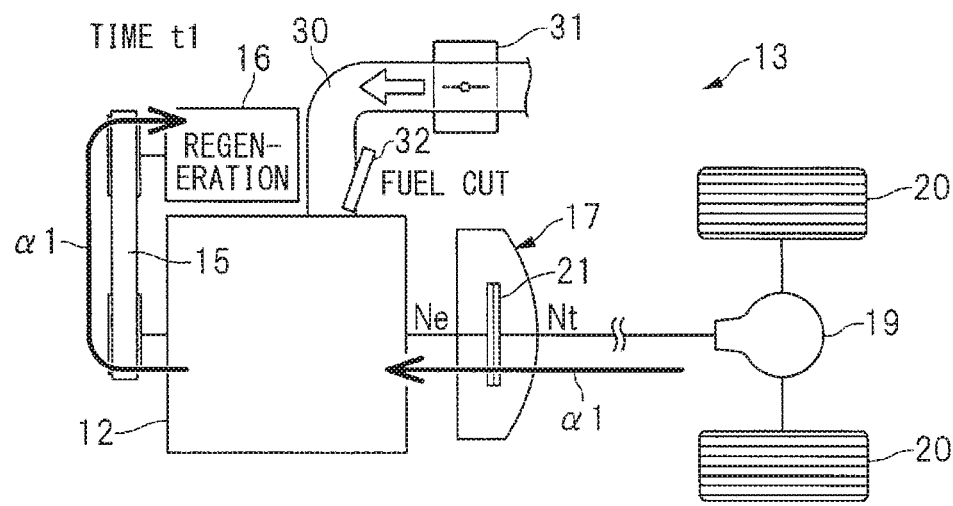
FIG. 9A schematically illustrates an example of an operation state of a power unit in the decelerated travel control.
Figure 9B:
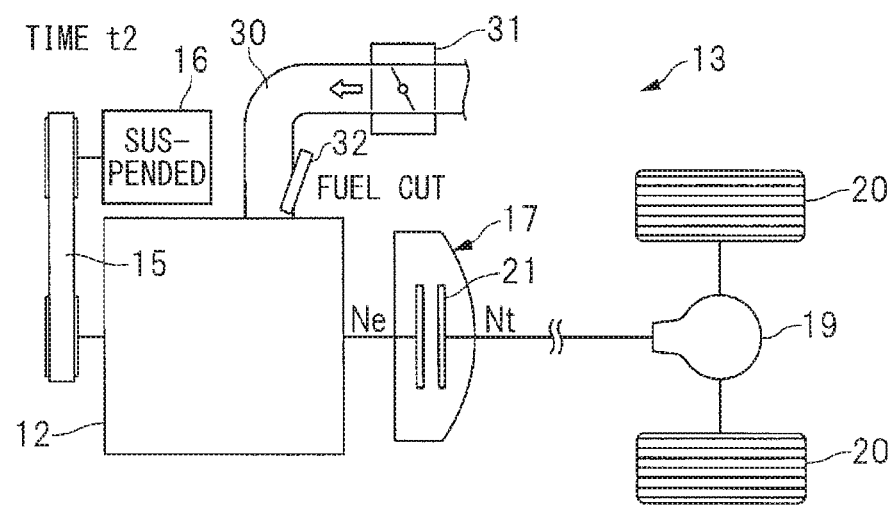
FIG. 9B schematically illustrates an example of the operation state of the power unit in the decelerated travel control.
Figure 9C:
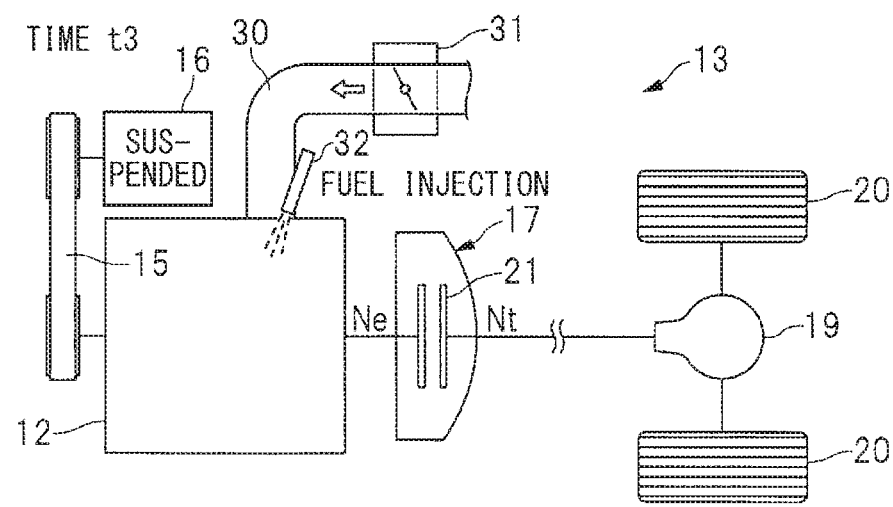
FIG. 9C schematically illustrates an example of the operation state of the power unit in the decelerated travel control.

A description is given of a decelerated travel control to be executed by the main controller 60. FIG. 8 is a timing chart illustrating one example of operation states of the starter generator 16, the injector 32, the throttle valve 31, and the ignition device 33 in the decelerated travel control. The decelerated travel as illustrated in FIG. 8 may be the coasting in which the stepping down of the accelerator pedal and the brake pedal is released. FIGS. 9A to 9C schematically illustrate one example of an operation state of the power unit 13 in the decelerated travel control. FIG. 9A illustrates a state at time t1 illustrated in FIG. 8. FIG. 9B illustrate a state at time t2 illustrated in FIG. 8. FIG. 9C illustrates a state at time t3 illustrated in FIG. 8.

In FIG. 8, reference characters "L/U" means the lock up clutch 21. Reference characters "ISG" means the starter generator 16. Reference characters "Th" means the throttle plate position of the throttle valve 31. Hereinafter, the throttle plate position of the throttle valve 31 is referred to as the throttle plate position. Reference characters "Pi" means an intake tube pressure inside the intake manifold 30. Furthermore, in FIGS. 8 and 9, reference characters "Ne" means the number of rotations of the engine, i.e., a rotation speed on input side, or engine side, of the lock up clutch 21. Reference characters "Nt" means the number of rotations of a turbine, i.e., a rotation speed on output side, or wheel side, of the lock up clutch 21. In the following description, the term "openwise" of the throttle valve 31 means a direction in which the throttle plate position becomes larger than a predetermined value X1, while the term "closewise" of the throttle valve 31 means a direction in which the throttle plate position becomes smaller than the predetermined value X1.

At the time t1 illustrated in FIG. 8, in the coasting in which the stepping down of the accelerator pedal is released, the engine 12 may be controlled to the fuel cut state (reference characters a1). The starter generator 16 may be controlled to the regenerative power-generation state (reference characters b1). The lock up clutch 21 may be controlled to the engaged state (reference characters c1). Specifically, as illustrated in FIG. 9A, in the coasting, the lock up clutch 21 may be engaged, making it possible to efficiently transmit rotational power from the wheels 20 to the starter generator 16, as denoted by an arrow α1. It is therefore possible to enhance regenerative torque, i.e., the power-generation torque, of the starter generator 16, and to increase the power-generated electric power in the coasting.

Moreover, at the time t1 illustrated in FIG. 8, in the coasting in which the regenerative power-generation is exerted, the throttle valve 31 may be controlled openwise (reference characters d1). Thus, controlling the throttle valve 31 openwise makes it possible to increase the amount of the intake air of the engine 12, and to reduce the pumping loss of the engine 12, as denoted by a white outlined arrow in FIG. 9A. This leads to reduction in the number of executions of engine braking in the event of deceleration of the vehicle. It is therefore possible to increase the power-generation torque without an excessive increase in the vehicle deceleration, and to increase the power-generated electric power, allowing for recovery of much kinetic energy. It is to be noted that in controlling the throttle valve 31 openwise, a negative pressure inside the intake manifold 30 decreases. Accordingly, the throttle plate position may be so adjusted as to prevent shortage of a negative pressure of, for example, an undepicted vacuum booster.

Thereafter, at the time t2 illustrated in FIG. 8, upon a switchover of the lock up clutch 21 from the engaged state to the disengaged state (reference characters c2), the throttle valve 31 is controlled from openwise to closewise (reference characters d2). Decreasing the throttle plate position Th in accompaniment with disengagement of the lock up clutch 21 makes it possible to lower the intake tube pressure Pi inside the intake manifold 30 (reference characters e1), and to decrease the amount of the intake air of the engine 12. Moreover, the disengagement of the lock up clutch 21 causes the number of rotations of the engine Ne to diverge from the number of rotations of the turbine Nt and to lower (reference characters f1). Furthermore, the disengagement of the lock up clutch 21 causes a significant decrease in the rotational power transmitted from the wheels 20 to the engine 12. This causes the starter generator 16 to be controlled to the power-generation suspended state (reference characters b2). It is to be noted that non-limiting examples of conditions on which the lock up clutch 21 is disengaged on the decelerated travel may include that the vehicle speed is lower than a predetermined value, that the vehicle deceleration is higher than a predetermined value, and that the number of rotations of the engine is smaller than a predetermined value. However, these example conditions are non-limiting.

At the time t3 illustrated in FIG. 8, upon the number of rotations of the engine Ne reaching a predetermined lower limit X2 (reference characters f2), the fuel injection into the engine 12 may be restarted (reference characters a2), from viewpoint of prevention of engine stall. In other words, in a case where the number of rotations of the engine Ne has lowered to reach the lower limit X2, the engine 12 may be switched from the fuel cut state to the fuel injection state. The restart of the fuel injection into the engine 12 causes the engine torque to be outputted to be directed toward acceleration of the vehicle 11. This contributes to a significant decrease in the vehicle deceleration, resulting in the possibility of the sense of incongruity given to the occupant. However, as mentioned above, the control apparatus for the vehicle 10 controls the throttle valve 31 closewise, upon the disengagement of the lock up clutch 21. This makes it possible to decrease the amount of the intake air of the engine 12, before the restart of the fuel injection. Hence, it is possible to reduce the engine torque to a smaller value, even in the case with the restart of the fuel injection into the engine 12. This allows for the restart of the fuel injection, without giving the sense of incongruity to the occupant.

Specifically, as denoted by a broken line Thx in FIG. 8 as a comparative example, starting to close the throttle valve 31 at the time t3 at which the fuel injection into the engine 12 is restarted causes a delay of the decrease in the intake tube pressure, as denoted by a broken line Pix. This contributes to difficulty in reducing the output of the engine torque. In contrast, starting to close the throttle valve 31 upon the disengagement of the lock up clutch 21 makes it possible to allow the intake tube pressure Pi to have lowered at the time t3 at which the fuel injection into the engine 12 is restarted, as denoted by an arrow P1. Hence, it is possible to reduce the engine torque to the smaller value, and to restart the fuel injection, without giving the sense of incongruity to the occupant.

Moreover, at the restart of the fuel injection into the engine 12, as denoted by reference characters g1, an ignition retard control, i.e., an ignition retard angle control, may be executed. The ignition retard control may include retarding ignition timing of the engine 12. This allows for further reduction in the engine torque, leading to suppression of excessive variations in the vehicle deceleration.

As described so far, referring to FIG. 9A, on the decelerated travel, the engine 12 may be controlled to the fuel cut state. The starter generator 16 may be controlled to the regenerative power-generation state. The lock up clutch 21 may be controlled to the engaged state. The throttle valve 31 may be controlled openwise. Thereafter, as illustrated in FIG. 9B, upon the lock up clutch 21 being controlled to the disengaged state, the throttle valve 31 may be controlled closewise, while the starter generator 16 may be controlled to the power-generation suspended state, with the engine 12 being maintained in the fuel cut state. Thereafter, as illustrated in FIG. 9C, upon the number of rotations of the engine reaching the predetermined lower limit, the fuel injection may be restarted, causing the engine 12 to be controlled to the fuel injection state.

Thus, as illustrated in FIG. 9B, in a case where the lock up clutch 21 is controlled to the disengaged state, the throttle valve 31 is controlled closewise. This makes it possible to decrease the amount of the intake air in preparation for the fuel injection into the engine 12, allowing for reduction in the engine torque at the restart of the fuel injection. It is therefore possible to restart the fuel injection, without giving the sense of incongruity to the occupant, even in a case where the throttle valve 31 has been open from viewpoint of getting an adequate amount of the power-generated electric power on the decelerated travel. Hence, it is possible to get the adequate amount of the power-generated electric power on the decelerated travel, without giving the sense of incongruity to the occupant.

[Decelerated Travel Control (Other Implementations)]

Figure 10:
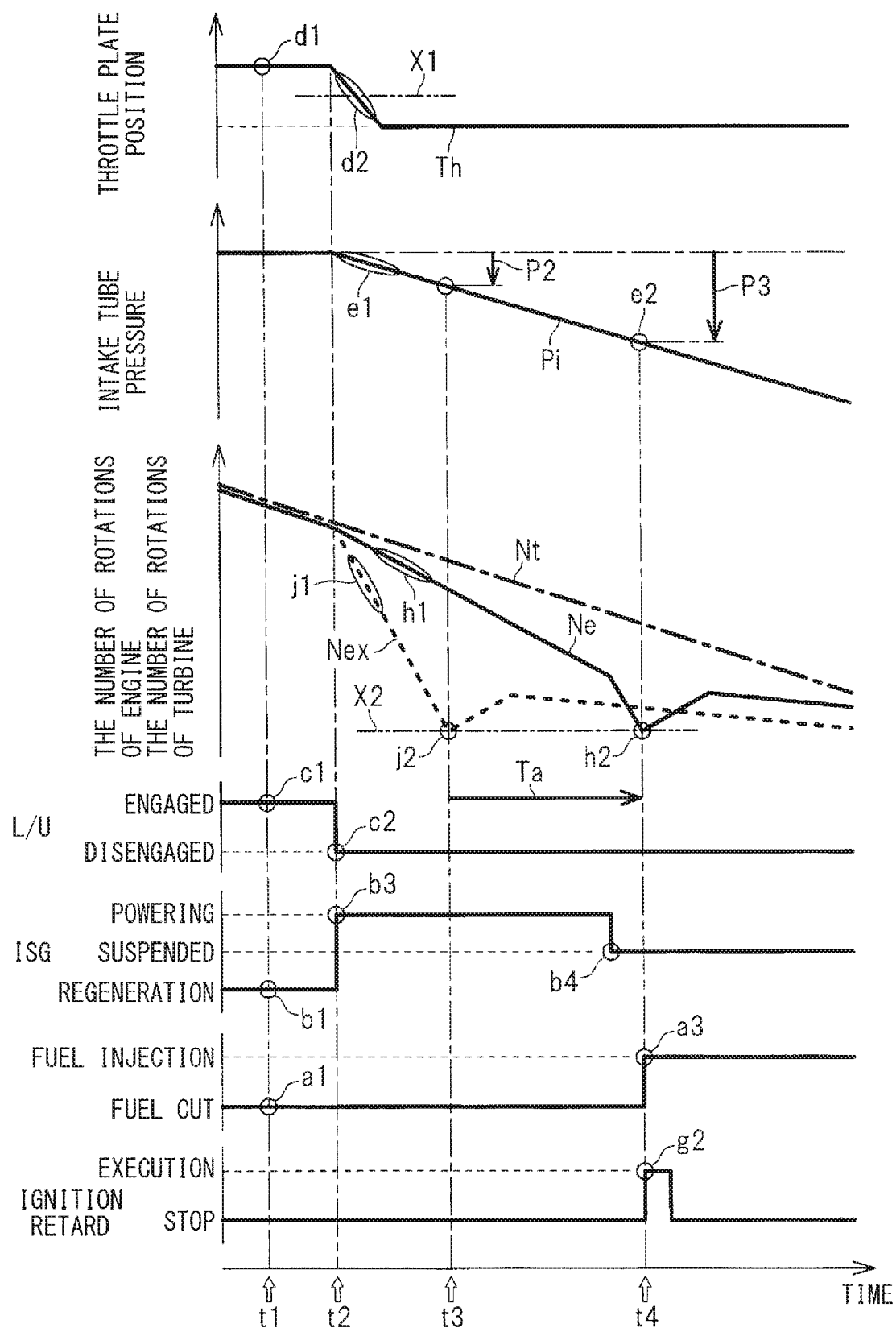
FIG. 10 is a timing chart illustrating another example of the operation states of the starter generator, the injector, the throttle valve, and the ignition device in the decelerated travel control.

In the forgoing description, the decelerated travel control includes controlling the starter generator 16 from the regenerative power-generation state to the power-generation suspended state. However, this is non-limiting. Description now moves on to another example of the decelerated travel control to be executed by the main controller 60. FIG. 10 is a timing chart illustrating another example of the operation states of the starter generator 16, the injector 32, the throttle valve 31, and the ignition device 33 in the decelerated travel control. The decelerated travel as illustrated in FIG. 10 may be the coasting in which the stepping down of the accelerator pedal and the brake pedal is released. FIGS. 11A to 11C schematically illustrate another example of the operation state of the power unit 13 in the decelerated travel control. FIG. 11A illustrates a state at the time t1 illustrated in FIG. 10. FIG. 11B illustrates a state at the time t2 illustrated in FIG. 10. FIG. 11C illustrates a state at time t4 illustrated in FIG. 10. It is to be noted that in FIGS. 10 and 11A to 11C, contents of the control similar to those of FIGS. 8 and 9A to 9C are denoted by the same reference characters, and description thereof is omitted.

At the time t1 illustrated in FIG. 10, in the coasting in which the stepping down of the accelerator pedal is released, the engine 12 may be controlled to the fuel cut state (reference characters a1). The starter generator 16 may be controlled to the regenerative power-generation state (reference characters b1). The lock up clutch 21 may be controlled to the engaged state (reference characters c1). The throttle valve 31 may be controlled openwise (reference characters d1).

Thereafter, at the time t2 illustrated in FIG. 10, upon the lock up clutch 21 being switched from the engaged state to the disengaged state (reference characters c2), the starter generator 16 may be controlled from the regenerative power-generation state to the powering state (reference characters b3). After the starter generator 16 has been controlled in the powering state for a predetermined period of time, the starter generator 16 may be controlled from the powering state to the power-generation suspended state (reference characters b4). Thus, bringing the starter generator 16 to the powering state in accompaniment with the disengagement of the lock up clutch 21 makes it possible to allow the starter generator 16 to assist the engine 12 in rotating. This allows for reduction in a speed of a decrease in the number of rotations of the engine Ne (reference characters h1).

Specifically, at the time t1 as mentioned above, engagement of the lock up clutch 21 makes it possible to efficiently transmit the rotational power from the wheels 20 to the engine 12, as denoted by an arrow α1 in FIG. 11A. It is therefore possible to keep the engine 12 rotating in association with the vehicle speed, even in a case where the engine 12 is controlled to the fuel cut state. However, at the time t2 in FIG. 10, the disengagement of the lock up clutch 21 causes a significant decrease in the rotational power transmitted from the wheels 20 to the engine 12. This results in a rapid fall of the number of rotations of the engine (reference characters j1), as denoted by a broken line Nex as a comparative example. Thus, upon the disengagement of the lock up clutch 21 (reference characters c2), the main controller 60 may control the starter generator 16 to the powering state (reference characters b3). This makes it possible to transmit the rotational power from the starter generator 16 to the engine 12, as denoted by an arrow α2 in FIG. 11B, and to reduce the speed of the decrease in the number of rotations of the engine Ne, as denoted by the reference characters h1 in FIG. 10.

As described above, bringing the starter generator 16 to the powering state, to reduce the speed of the decrease in the number of rotations of the engine Ne, makes it possible to prolong the time it takes for the number of rotations of the engine Ne to reach the lower limit X2. In other words, it is possible to allow the intake tube pressure Pi inside the intake manifold 30 to lower sufficiently, before the restart of the fuel injection into the engine 12 (reference characters e2), leading to sufficient reduction in the amount of the intake air of the engine 12. This makes it possible to reduce the engine torque to the smaller value, even in the case with the restart of the fuel injection into the engine 12. Hence, it is possible to restart the fuel injection, without giving the sense of incongruity to the occupant.

As denoted by the broken line Nex, in a case without assistance of the starter generator 16 with engine rotation, the number of rotations of the engine reaches the lower limit X2 at the time t3 (reference characters j2), resulting in the restart of the fuel injection into the engine 12. In contrast, as denoted by a solid line Ne, in a case with the assistance of the starter generator 16 with the engine rotation, as denoted by an arrow Ta, the number of rotations of the engine reaches the lower limit X2 at the time t4 later than the time t3 (reference characters h2), resulting in the restart of the fuel injection into the engine 12 (reference characters a3).

Specifically, in the case without the assistance of the starter generator 16 with the engine rotation, the intake tube pressure Pi lowers as denoted by an arrow P2. Meanwhile, in the case with the assistance of the starter generator 16 with the engine rotation, as denoted by an arrow P3, it is possible to lower the intake tube pressure Pi even more significantly. As described above, the assistance of the starter generator 16 with the engine rotation allows for the prolongation of the time until the restart of the fuel injection into the engine 12, making it possible to sufficiently lower the intake tube pressure Pi. Hence, it is possible to reduce the engine torque to the smaller value, leading to the restart of the fuel injection, without giving the sense of incongruity to the occupant.

Moreover, at the restart of the fuel injection into the engine 12, as denoted by reference characters g2, the ignition retard control, i.e., the ignition retard angle control, may be executed. The ignition retard control may include retarding the ignition timing of the engine 12. This allows for the further reduction in the engine torque, making it possible to suppress the excessive variations in the vehicle deceleration.

As described above, referring to FIG. 11A, on the decelerated travel, the engine 12 may be controlled to the fuel cut state. The starter generator 16 may be controlled to the regenerative power-generation state. The lock up clutch 21 may be controlled to the engaged state. The throttle valve 31 may be controlled openwise. Thereafter, as illustrated in FIG. 11B, upon the lock up clutch 21 being controlled to the disengaged state, the throttle valve 31 may be controlled closewise, while the starter generator 16 may be controlled to the powering state, with the engine 12 being kept in the fuel cut state. Thereafter, as illustrated in FIG. 11C, upon the number of rotations of the engine reaching the predetermined lower limit, the fuel injection may be restarted, causing the engine 12 to be controlled to the fuel injection state.

As illustrated in FIG. 11B, in the case where the lock up clutch 21 is controlled to the disengaged state, the throttle valve 31 is controlled closewise. This makes it possible to decrease the amount of the intake air, in preparation for the fuel injection into the engine 12. Furthermore, in the case where the lock up clutch 21 is controlled to the disengaged state, the starter generator 16 may be controlled to the powering state. This makes it possible to prolong the time until the restart of the fuel injection into the engine 12. From this viewpoint as well, it is possible to decrease the amount of the intake air, in preparation for the fuel injection into the engine 12. It is therefore possible to reduce the engine torque at the restart of the fuel injection, allowing for the restart of the fuel injection, without giving the sense of incongruity to the occupant, even in the case where the throttle valve 31 has been open from viewpoint of getting the adequate amount of the power-generated electric power on the decelerated travel. Hence, it is possible to get the adequate amount of the power-generated electric power on the decelerated travel, without giving the sense of incongruity to the occupant.

Although some implementations of the technology have been described in the forgoing with reference to the accompanying drawings, the technology is by no means limited to the implementations described above. Various changes and modifications may be made to any implementation without departing from the scope of the technology. In the forgoing description, the decelerated travel of the vehicle 11 is exemplified by the coasting, i.e., inertia travel. However, this is non-limiting. For example, the throttle valve 31 may be controlled from openwise to closewise, in a case where the lock up clutch 21 is controlled from the engaged state to the disengaged state, on the decelerated travel on which the vehicle 11 decelerates while the brake pedal is stepped down. Moreover, the starter generator 16 may be controlled from the regenerative power-generation state to the powering state, in the case where the lock up clutch 21 is controlled from the engaged state to the disengaged state, on the decelerated travel on which the vehicle 11 decelerates while the brake pedal is stepped down. To control the throttle valve 31 "openwise", it suffices to allow the throttle plate position to be greater than a predetermined value X1. Specifically, to control the throttle valve 31 "openwise" may be to allow the throttle plate position to be a fully open state or any other position than the fully open state. To control the throttle valve 31 "closewise", it suffices to allow the throttle plate position to be smaller than the predetermined value X1. Specifically, to control the throttle valve 31 "closewise" may be to allow the throttle plate position to be a fully closed state or any other position than the fully closed state.

In the forgoing description, at the restart of the fuel injection into the engine 12, the ignition retard control of the engine 12 is executed. However, this is non-limiting. For example, if the engine torque is sufficiently reduced by controlling the throttle valve 31 closewise or by controlling the starter generator 16 to the powering state, the fuel injection may be restarted, without executing the ignition retard control. Moreover, in the example illustrated in FIG. 10, the starter generator 16 is controlled in the powering state for the predetermined period of time. However, this is non-limiting. For example, the starter generator 16 may be controlled in the powering state until the intake tube pressure Pi reaches a predetermined target value.

In the forgoing description, the starter generator 16 is adopted as the "electric generator". However, this is non-limiting. An alternator may be adopted as the "electric generator", or alternatively, a motor generator may be adopted as the "electric generator". Moreover, in the forgoing description, the main controller 60 serves as an "engine control unit", a "throttle control unit", an "electric generator control unit", and a "clutch control unit". However, this is non-limiting. Another controller or other controllers may serve as the "engine control unit", the "throttle control unit", the "electric generator control unit", or the "clutch control unit", or any combination thereof.

In the forgoing description, the two electricity storage devices are coupled to the starter generator 16. However, this is non-limiting. A single electricity storage device may be coupled to the starter generator 16. Moreover, in the forgoing description, the lithium-ion battery 42 and the lead battery 41 are employed as the electricity storage devices coupled to the starter generator 16. However, this is non-limiting. Other kinds of batteries or capacitors may be adopted. The electricity storage devices are not limited to different kinds of electricity storage devices, but may be the same kind of electricity storage devices. Moreover, in the example illustrated in FIGS. 1 and 2, the switch SW2 is provided on the positive electrode line 44 of the lithium-ion battery 42. However, this is non-limiting. For example, as indicated by an alternate long and short dashed line in FIG. 2, the switch SW2 may be provided on the negative electrode line 48 of the lithium-ion battery 42.

According to the example implementations of the technology, the throttle control unit controls the throttle valve from openwise to closewise in the case where the lock up clutch is controlled from the engaged state to the disengaged state, with the throttle valve having been controlled openwise in accompaniment with the regenerative power-generation of the electric generator. Hence, it is possible to get the adequate amount of the power-generated electric power on the decelerated travel, without giving the sense of incongruity to the occupant.

The main controller 60, the engine control unit 61, the throttle control unit 62, the electric generator control unit 63, and the clutch control unit 64 illustrated in FIGS. 1 and 3 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60, the engine control unit 61, the throttle control unit 62, the electric generator control unit 63, or the clutch control unit 64, or any combination thereof. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the main controller 60, the engine control unit 61, the throttle control unit 62, the electric generator control unit 63, and the clutch control unit 64 illustrated in FIGS. 1 and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus for a vehicle that includes an engine, the control apparatus comprising:
   an electric generator configured to be coupled to the engine;
   a lock up clutch configured to be coupled to the engine;
   a throttle valve configured to control an amount of intake air of the engine;
   an electric generator control unit configured to allow the electric generator to perform regenerative power-generation on decelerated travel of the vehicle;
   a clutch control unit configured to control the lock up clutch to an engaged state on a condition that the electric generator performs the regenerative power-generation; and
   a throttle control unit configured to control the throttle valve openwise on the condition that the electric generator performs the regenerative power-generation,
   the throttle control unit being configured to control the throttle valve from openwise to closewise on a condition that the lock up clutch is controlled from the engaged state to a disengaged state, with the throttle valve having been controlled openwise in accompaniment with the regenerative power-generation of the electric generator.

2. The control apparatus for the vehicle according to claim 1, further comprising an engine control unit configured to control the engine, wherein
   the engine control unit controls the engine from a fuel cut state to a fuel injection state, after the throttle valve has been controlled closewise on the condition that the lock up clutch is controlled to the disengaged state.

3. The control apparatus for the vehicle according to claim 2, wherein the engine control unit executes an ignition retard control in controlling the engine from the fuel cut state to the fuel injection state, the ignition retard control including retarding ignition timing.

4. The control apparatus for the vehicle according to claim 3, wherein
   the electric generator comprises a generator motor, and
   the electric generator control unit controls the generator motor from a regenerative power-generation state to a powering state, on the condition that the lock up clutch is controlled from the engaged state to the disengaged state, with the throttle valve having been controlled openwise in accompaniment with the regenerative power-generation of the generator motor.

5. The control apparatus for the vehicle according to claim 4, wherein controlling the generator motor to the powering state causes the generator motor to assist the engine in the fuel cut state in rotating.

6. The control apparatus for the vehicle according to claim 5, wherein the engine control unit controls the engine from the fuel cut state to the fuel injection state, on a condition that a rotation speed of the engine has lowered to a lower limit.

7. The control apparatus for the vehicle according to claim 4, wherein the engine control unit controls the engine from the fuel cut state to the fuel injection state, on a condition that a rotation speed of the engine has lowered to a lower limit.

8. The control apparatus for the vehicle according to claim 3, wherein the engine control unit controls the engine from the fuel cut state to the fuel injection state, on a condition that a rotation speed of the engine has lowered to a lower limit.

9. The control apparatus for the vehicle according to claim 2, wherein
   the electric generator comprises a generator motor, and
   the electric generator control unit controls the generator motor from a regenerative power-generation state to a powering state, on the condition that the lock up clutch is controlled from the engaged state to the disengaged state, with the throttle valve having been controlled openwise in accompaniment with the regenerative power-generation of the generator motor.

10. The control apparatus for the vehicle according to claim 9, wherein controlling the generator motor to the powering state causes the generator motor to assist the engine in the fuel cut state in rotating.

11. The control apparatus for the vehicle according to claim 10, wherein the engine control unit controls the engine from the fuel cut state to the fuel injection state, on a condition that a rotation speed of the engine has lowered to a lower limit.

12. The control apparatus for the vehicle according to claim 9, wherein the engine control unit controls the engine from the fuel cut state to the fuel injection state, on a condition that a rotation speed of the engine has lowered to a lower limit.

13. The control apparatus for the vehicle according to claim 2, wherein the engine control unit controls the engine from the fuel cut state to the fuel injection state, on a condition that a rotation speed of the engine has lowered to a lower limit.

14. The control apparatus for the vehicle according to claim 1, wherein
   the electric generator comprises a generator motor, and
   the electric generator control unit controls the generator motor from a regenerative power-generation state to a powering state, on the condition that the lock up clutch is controlled from the engaged state to the disengaged state, with the throttle valve having been controlled openwise in accompaniment with the regenerative power-generation of the generator motor.

15. The control apparatus for the vehicle according to claim 14, wherein controlling the generator motor to the powering state causes the generator motor to assist the engine in a fuel cut state in rotating.

16. The control apparatus for the vehicle according to claim 15,
   wherein the engine control unit controls the engine from a fuel cut state to a fuel injection state, on a condition that a rotation speed of the engine has lowered to a lower limit.

17. The control apparatus for the vehicle according to claim 14, wherein the engine control unit controls the engine from a fuel cut state to a fuel injection state, on a condition that a rotation speed of the engine has lowered to a lower limit.

18. A control apparatus for a vehicle that includes an engine, the control apparatus comprising:
   an electric generator configured to be coupled to the engine;
   a lock up clutch configured to be coupled to the engine;
   a throttle valve configured to control an amount of intake air of the engine; and
   circuitry configured to
      allow the electric generator to perform regenerative power-generation on decelerated travel of the vehicle, control the lock up clutch to an engaged state on a condition that the electric generator performs the regenerative power-generation, control the throttle valve openwise on the condition that the electric generator performs the regenerative power-generation, and control the throttle valve from openwise to closewise on a condition that the lock up clutch is controlled from the engaged state to a disengaged state, with the throttle valve having been controlled openwise in accompaniment with the regenerative power-generation of the electric generator.

* * * * *